US011167295B2

(12) United States Patent
Maciulewicz

(10) Patent No.: US 11,167,295 B2
(45) Date of Patent: Nov. 9, 2021

(54) INFEED CHUTES FOR MATERIAL APPLICATION MACHINES

(71) Applicant: DHG, Inc., Fairfield, OH (US)

(72) Inventor: Gordon Maciulewicz, Monroe, OH (US)

(73) Assignee: DHG, INC., Fairfield, OH (US)

(*) Notice: Subject to any disclaimer, the term of this patent is extended or adjusted under 35 U.S.C. 154(b) by 531 days.

(21) Appl. No.: 16/114,926

(22) Filed: Aug. 28, 2018

(65) Prior Publication Data

US 2020/0070185 A1    Mar. 5, 2020

(51) Int. Cl.
| | | |
|---|---|---|
| *B05B 1/20* | (2006.01) | |
| *A01C 7/08* | (2006.01) | |
| *A01C 7/06* | (2006.01) | |
| *A01C 7/00* | (2006.01) | |
| *A01C 7/20* | (2006.01) | |
| *B05B 7/32* | (2006.01) | |

(52) U.S. Cl.
CPC ............. *B05B 1/202* (2013.01); *A01C 7/004* (2013.01); *A01C 7/06* (2013.01); *A01C 7/082* (2013.01); *A01C 7/201* (2013.01); *B05B 7/32* (2013.01)

(58) Field of Classification Search
CPC ..................................................... B05B 1/202
USPC ........... 366/137.1, 168.1, 172.2, 174.1, 175.2
See application file for complete search history.

(56) References Cited

U.S. PATENT DOCUMENTS

| | | | | |
|---|---|---|---|---|
| 45,369 | A | * 12/1864 | Maitland | ................... B01F 7/00 |
| | | | | 366/181.3 |
| 563,978 | A | * 7/1896 | Meinshausen | ........ B01F 5/0451 |
| | | | | 366/173.2 |
| 1,043,644 | A | * 11/1912 | Thomas | ................ B01F 5/0451 |
| | | | | 366/175.2 |
| 2,126,911 | A | * 8/1938 | Mullen | ..................... B01F 5/02 |
| | | | | 516/77 |
| 3,164,443 | A | * 1/1965 | Watson | ................... C08B 30/16 |
| | | | | 422/278 |
| 4,086,663 | A | * 4/1978 | Croft | ..................... B01F 5/0256 |
| | | | | 366/137.1 |
| 4,662,759 | A | * 5/1987 | Leibee | .................... E01C 19/46 |
| | | | | 366/11 |
| 6,357,906 | B1 | * 3/2002 | Baudoin | ............... B01F 5/0206 |
| | | | | 366/136 |
| 6,866,211 | B2 | 3/2005 | Paulsen et al. | |
| 7,182,273 | B2 | 2/2007 | Proulx, Jr. | |
| 9,730,377 | B2 | 8/2017 | Kowalchuk | |

(Continued)

FOREIGN PATENT DOCUMENTS

| | | |
|---|---|---|
| CN | 204031752 U | 12/2014 |
| CN | 206688071 U | 12/2017 |
| JP | 3491846 B2 | 1/2004 |

*Primary Examiner* — David L Sorkin
(74) *Attorney, Agent, or Firm* — Dinsmore & Shohl LLP

(57) ABSTRACT

An infeed chute for a material application machine includes a riser and a water spreading unit. The riser includes a sidewall and defines an infeed opening extending through the riser. The riser is configured to be coupled to an opening of a tank of a material application machine such that application material passed through the infeed opening of the riser enters the tank of the material application machine. The sidewall includes a water inlet formed therein. The water spreading unit is coupled to the water inlet and is configured to direct water laterally across the infeed chute.

7 Claims, 8 Drawing Sheets

(56) References Cited

U.S. PATENT DOCUMENTS 9,832,923 B2 12/2017 Thomas
2016/0029551 A1 2/2016 Crivello

* cited by examiner

INFEED CHUTES FOR MATERIAL APPLICATION MACHINES

TECHNICAL FIELD

The present specification generally relates to infeed chutes for material application machines and, more specifically, infeed chutes for material application machines that provide a water spreading feature.

BACKGROUND

Material application machines are used to provide ground coverage material in the form of seed, mulch, etc. For example, hydroseeding (or hydraulic mulch seeding, hydromulching, hydraseeding) is a planting process that generally uses a material slurry of water, seed, hydro-mulch, and fertilizer. The material slurry is produced within a mixing tank by mixing the various ingredients with an agitator. The material slurry is then drawn out by a material pump and spraying unit for application to prepared ground. The seed, hydro-mulch, and fertilizer may be provided in pressed/dry 50 lb. material bales. Most current systems require a user to lift and drop the full 50 lb. bale into the mixing tank where it is soaked by the water and gets broken up by the agitator. This breaking up process may cause pieces of the bale to fly around or pop back out of the mixing tank. Accordingly, less of the material bale may make it into the material slurry.

A need exists for alternative infeed chutes and material application machines that increase efficiency of material slurry production and reduce stray pieces of material bale from coming back out of the mixing tank.

SUMMARY

Embodiments of the present disclosure address this need for improved efficiency and reduction in loss of material.

In one embodiment, an infeed chute for a material application machine includes a riser and a water spreading unit. The riser includes a sidewall and defines an infeed opening extending through the riser. The riser is configured to be coupled to an opening of a tank of a material application machine such that application material passed through the infeed opening of the riser enters the tank of the material application machine. The sidewall includes a water inlet formed therein. The water spreading unit is coupled to the water inlet and is configured to direct water laterally across the infeed chute.

In another embodiment, a material application machine includes a tank and an infeed chute. The tank includes an opening and is configured to hold an application material, The infeed chute includes a riser and a water spreading unit. The riser includes a sidewall and defines an infeed opening extending through the riser. The riser is coupled to the opening of the tank such that the application material passed through the infeed opening of the riser enters the tank. The sidewall includes a water inlet formed therein. The water spreading unit is coupled to the water inlet and is configured to direct water laterally across the infeed chute.

In yet another embodiment, a hydroseeder includes a tank, an infeed chute, and a water inlet. The tank includes an opening and is configured to hold a material slurry. The infeed chute is coupled to the opening of the tank above a plurality of grinding flights positioned within the tank. The water inlet is incorporated into a sidewall of the infeed chute and is configured to direct water laterally across the infeed chute.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to infeed chutes for material application machines. Material application machines generally include machines used to apply ground coverage or other application materials to the ground. For example, material application machines may include hydroseeders, barkblowers, or the like. In particular, as will be described in greater detail herein, the infeed chute may include a water inlet and/or water spreading unit that sprays water across the opening of the infeed chute to pre-wet material bales of application material as they are passed through the infeed chute and into a tank of the material application machine. By pre-wetting the application material as it enters the material application machine, the weight of the material increases which may prevent the material from coming back up through the infeed chute before it enters the tank of the material application machine.

Moreover, the water curtain also acts to block application material that tries to come back up through the infeed chute. These and additional features will be described in greater detail below.

Figure 1:
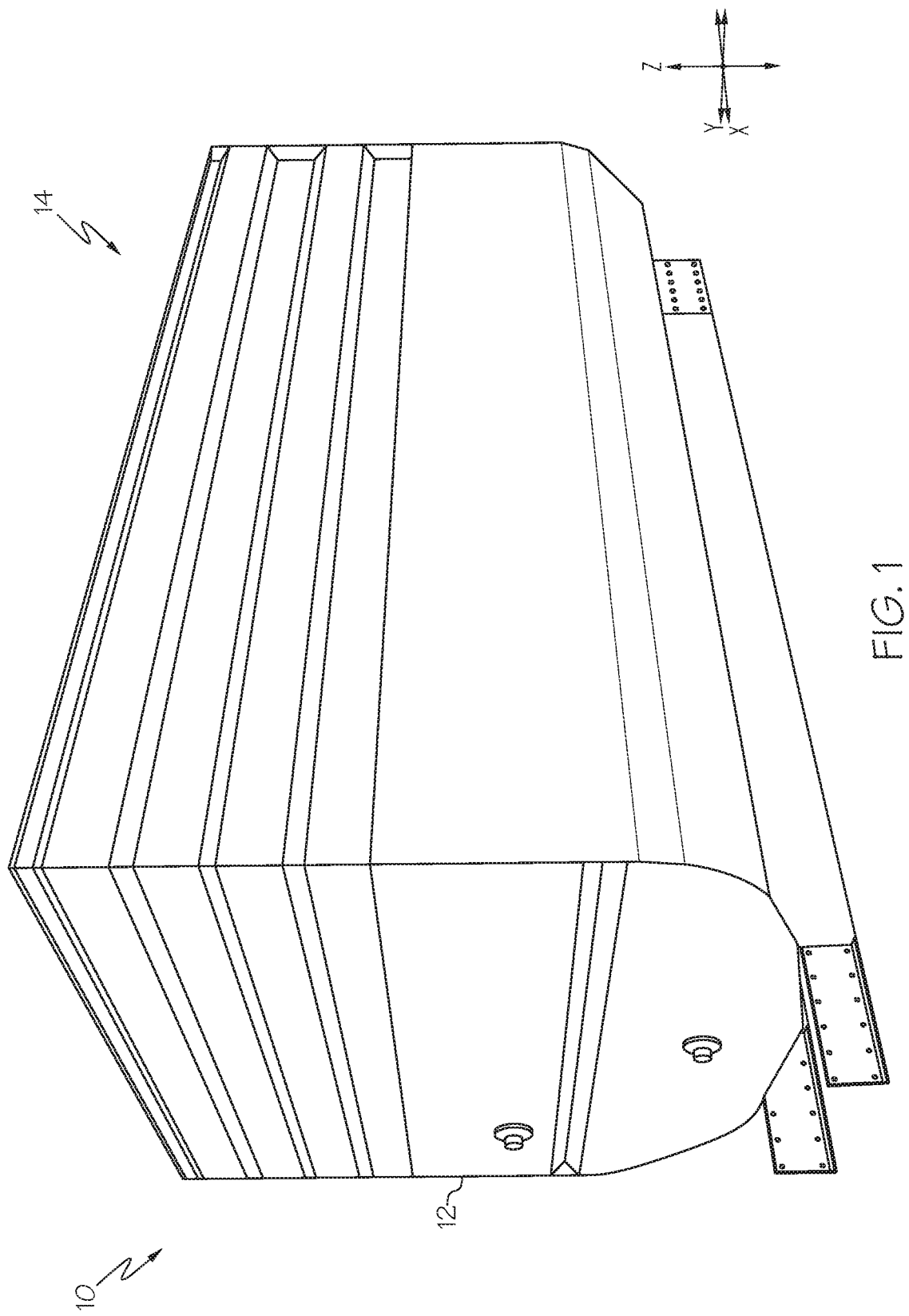
FIG. 1 depicts a perspective view of a hydroseeder, according to one or more embodiments shown and described herein.

Referring now to FIG. 1, a material application machine 10 is generally depicted. Though not shown, the material application machine 10 may be positioned or integrated into a vehicle or trailer to aid in transporting the material application machine 10 to a location for performing a material application operation (i.e., distributing ground cover over a desired location). In some embodiments and as noted herein, the material application machine 10 may be a hydroseeder. Hydroseeding is a planting process that uses a material slurry 400 of seed, mulch, fertilizer, and liquid (e.g., water 262) that is sprayed onto prepared earth. However, material application machines such as hydroseeders may be useful in applications beyond hydroseeding. In particular, material application machines may also be used for, for example, application of alternate daily cover (ADC) for landfills and/or application of mulch, fertilizer, and/or water to a location without seed. Accordingly, it is contemplated that the material slurry may include a fewer or greater number of components (e.g., water, seed, mulch, fertilizer, or any combination thereof) without departing from the scope of the present disclosure. As will be described in greater detail herein, the material application machine 10 is configured to produce the material slurry 400 to be used in the material application operation.

Figure 2:
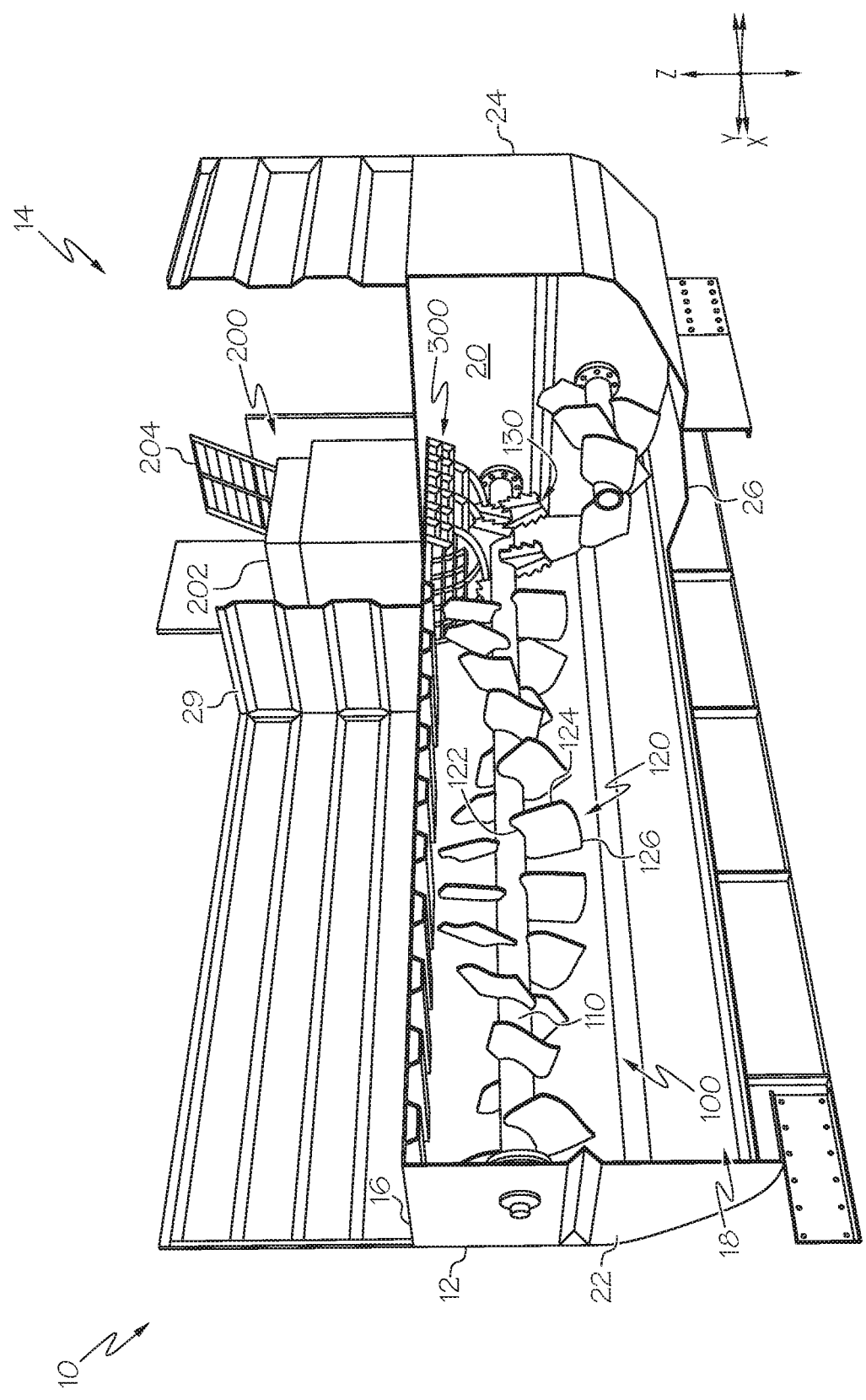
FIG. 2 depicts a sectional view of the hydroseeder of FIG. 1, according to one or more embodiments shown and described herein.

To accommodate production of the material slurry 400, the material application machine 10 includes a tank 12. In operation, the tank 12 holds the material slurry therein. Referring also to FIG. 2, a sectional view of the material application machine 10 illustrating an interior 18 of the tank 12 is depicted. The tank 12 may include an opening 14 that allows access to the interior 18 of the tank 12. Bales of application material may be passed through the opening 14 and into the interior 18 of the tank 12. The material bales may then be broken up and mixed with water to create the material slurry. As will be described in greater detail herein water may be supplied to the tank 12 through the opening 14. It is noted that while the description generally refers to material bales throughout, the present embodiments may also be used in applications wherein the application material is added to the tank 12 as loose material.

As will be described in greater detail herein, material bales may be broken up with a bale grinder (e.g., grinding flights 130) incorporated in an agitator 100. As described above, material bales may include a mixture of seed, hydromulch, and fertilizer that has been compressed into a bale. However, as discussed above, material application machines may be used for non-seeding operations. Accordingly, it is contemplated that material bales may include a fewer or greater number of components (e.g., seed, mulch, fertilizer, other ground coverage materials, or any combination thereof) without departing from the scope of the present disclosure.

In some embodiments, and as illustrated in FIGS. 1 and 2 the tank 12 may include a top wall 16 through which the opening 14 is formed and sidewalls extending from the top wall 16. The top wall 16 may define a platform. The platform may be supported by the sidewall(s) of the tank 12 and may support a weight of a user standing thereon. In the illustrated embodiment, the tank 12 includes first and second lateral sidewalls 20, 22 that are positioned opposite one another and are connected by longitudinal sidewalls 24 and a base wall 26 to enclose the interior 18 of the tank 12.

In some embodiments, a railing 29 may be coupled to the top wall 16 to provide at least a partial enclosure to the platform as defined by the top wall 16. For example, the railing 29 may be coupled through any conventional coupling techniques including, but not limited to, the use of fasteners (e.g., bolts) or welding. In use, an operator may stand on the platform and using a spraying system (e.g., a sprayer and a material pump, not shown) fluidly coupled to the interior 18 of the tank 12 to discharge the material slurry 400 within the tank 12 to a desired location. While material application machines are generally described in relation to the figures, it is noted that material application machines may have various shapes and constructions without departing from the scope of the present disclosure.

Referring to the embodiment of FIG. 2, an infeed chute 200 may be positioned over the opening 14 to provide a material chute for material bales and/or loose application material to be passed through. The infeed chute 200 may include a hatch 202 coupled to an end of the infeed chute 200. The hatch 202 may have a grate 204, lid, or similar structure for example rotatably relative to the infeed chute 200 to allow and/or prevent access to the opening 14 of the tank 12 through the infeed chute 200.

Figure 3A:
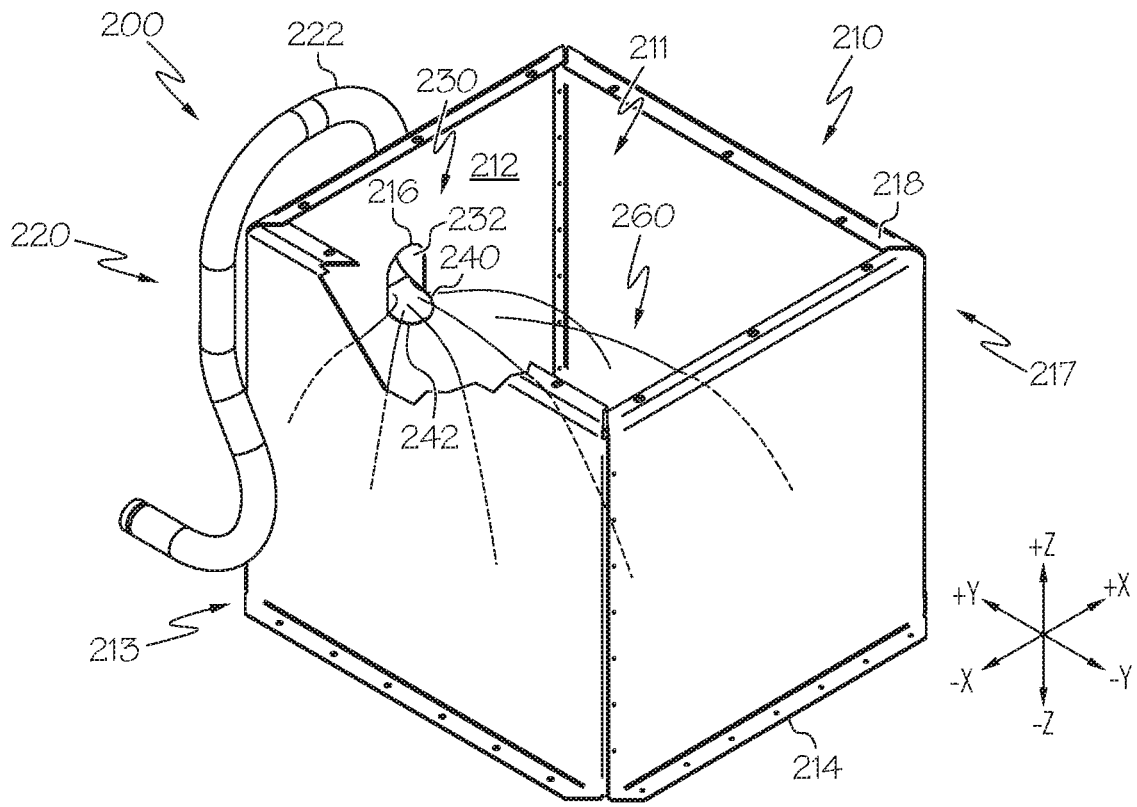
FIG. 3A depicts an infeed chute with a broken out section, according to one or more embodiments shown and described herein.
Figure 3B:
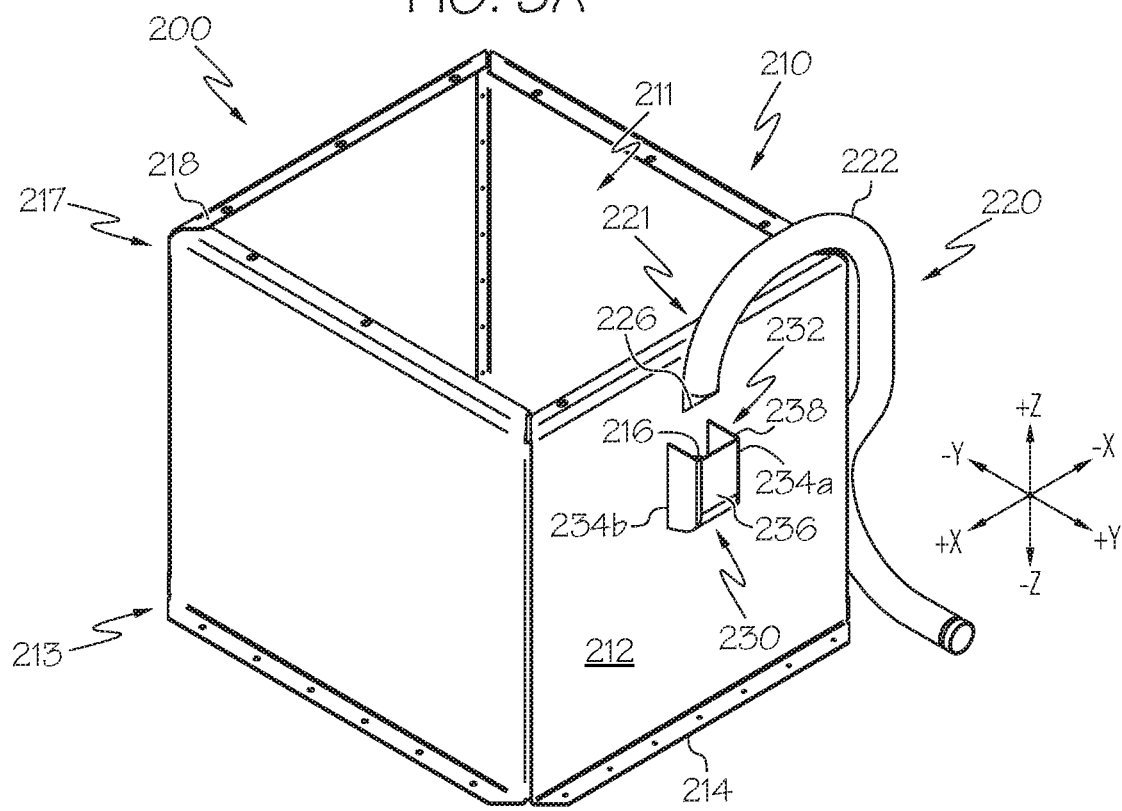
FIG. 3B is a perspective view of the infeed chute of FIG. 3A without the broken out section, according to one or more embodiments shown and described herein.

FIG. 3A and 3B illustrates the infeed chute 200 in isolation from a material application machine 10 (such as illustrated in FIG. 2.) The infeed chute 200 generally includes a riser 210. The riser 210 has a side wall 212. In the embodiment illustrated, the riser 210 includes four sidewalls to generally define a parallelogram. However, the shape of the riser 210 is not so limited. The riser 210 may have any number of sidewalls and can encompass a variety of regular (e.g., circle, square, rectangular, etc.) and irregular shapes. The sidewalls of the riser 210 may define an infeed opening 211 extending therethrough. One or more of the sidewalls may be integrally formed with one another or otherwise coupled to one another through various coupling mechanisms including, but not limited to, the use of fasteners, welding, adhesives, and the like.

Extending along a base 213 of the riser 210 may be an attachment flange 214. The attachment flange 214 may extend along a perimeter of the base 213 of the riser 210 or only a portion there of The attachment flange 214 may allow the infeed chute 200 to be attached to the opening 14 (e.g., around the opening 14) of the tank 12, as noted above. For example, fasteners may be passed through the attachment flange 214 and through the top wall 16 of the tank 12 around the opening 14 to fix the infeed chute 200 relative to the opening 14. In other embodiments, the infeed chute 200 may be welded or otherwise attached to the opening 14 of the tank 12 of the material application machine 10.

Figure 4A:
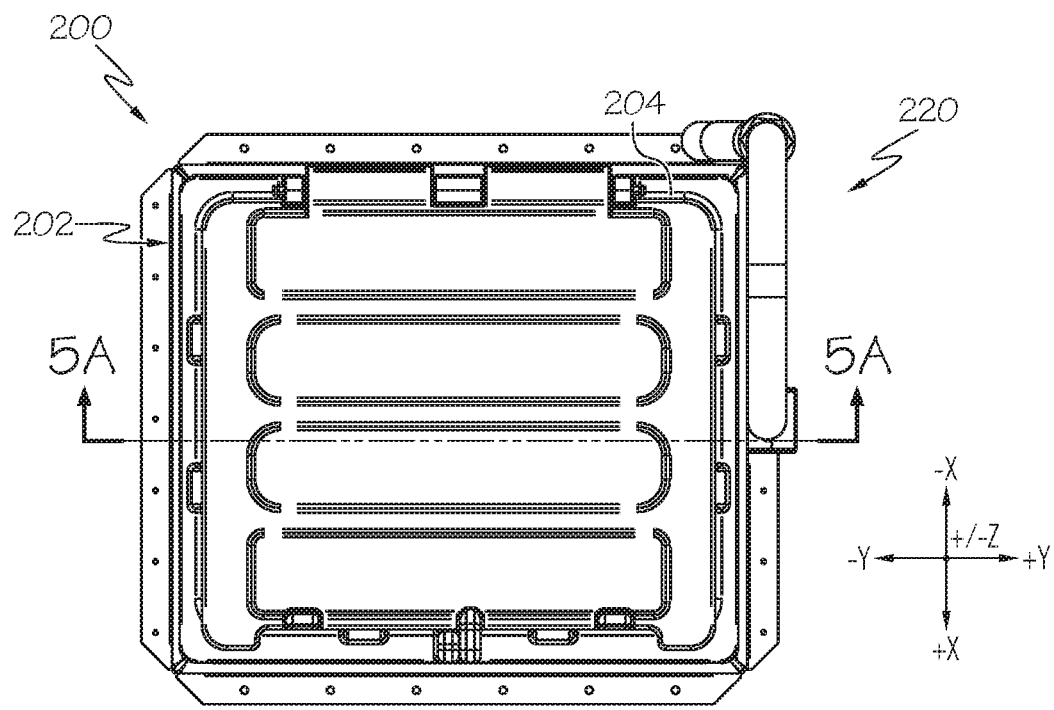
FIG. 4A depicts a top view of an infeed chute, according to one or more embodiments shown and described herein.
Figure 4B:
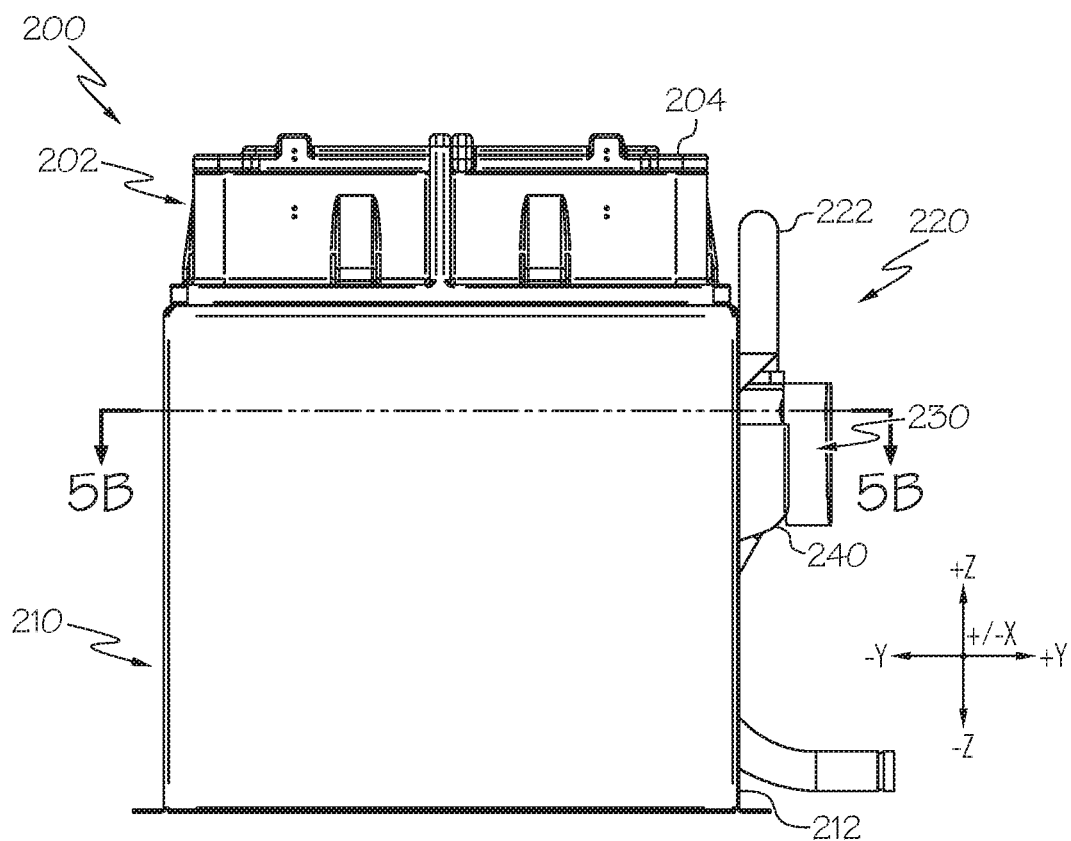
FIG. 4B depicts a side view of the infeed chute of FIG. 3A, according to one or more embodiments shown and described herein.
Figure 4C:
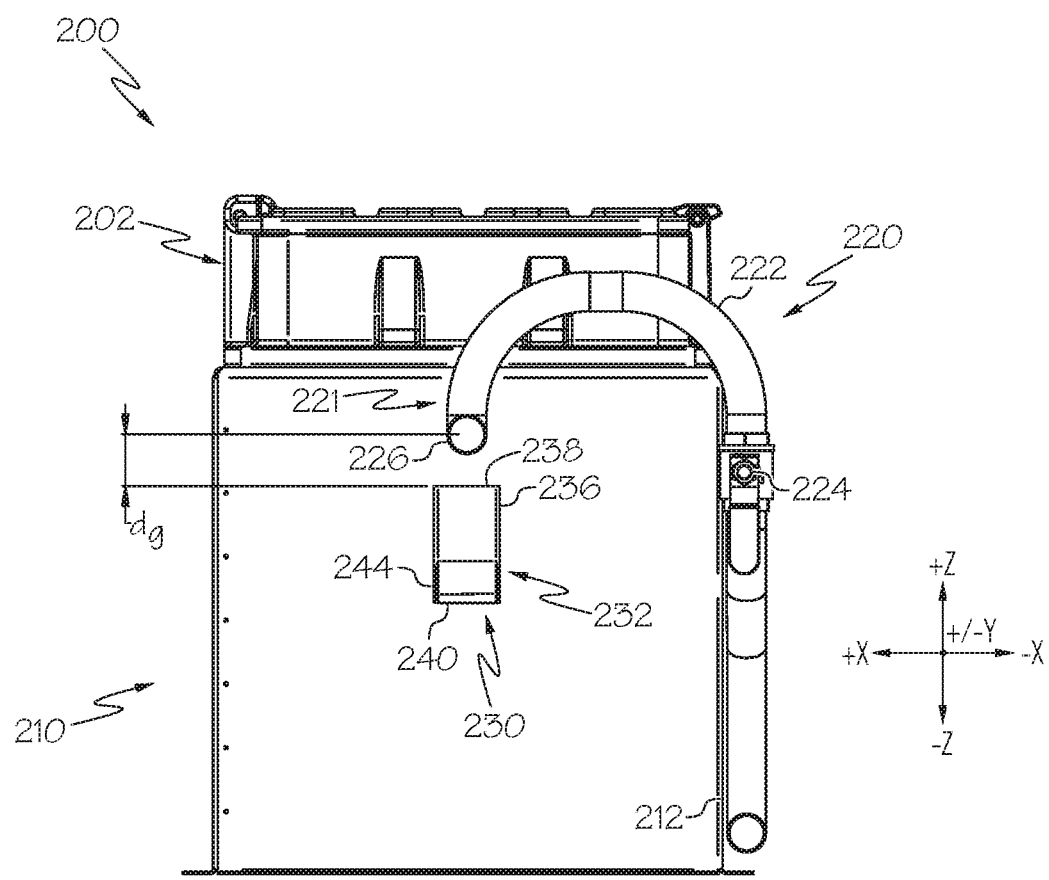
FIG. 4C depicts another side view of the infeed chute of FIG. 3B, according to one or more embodiments shown and described herein.
Figure 5A:
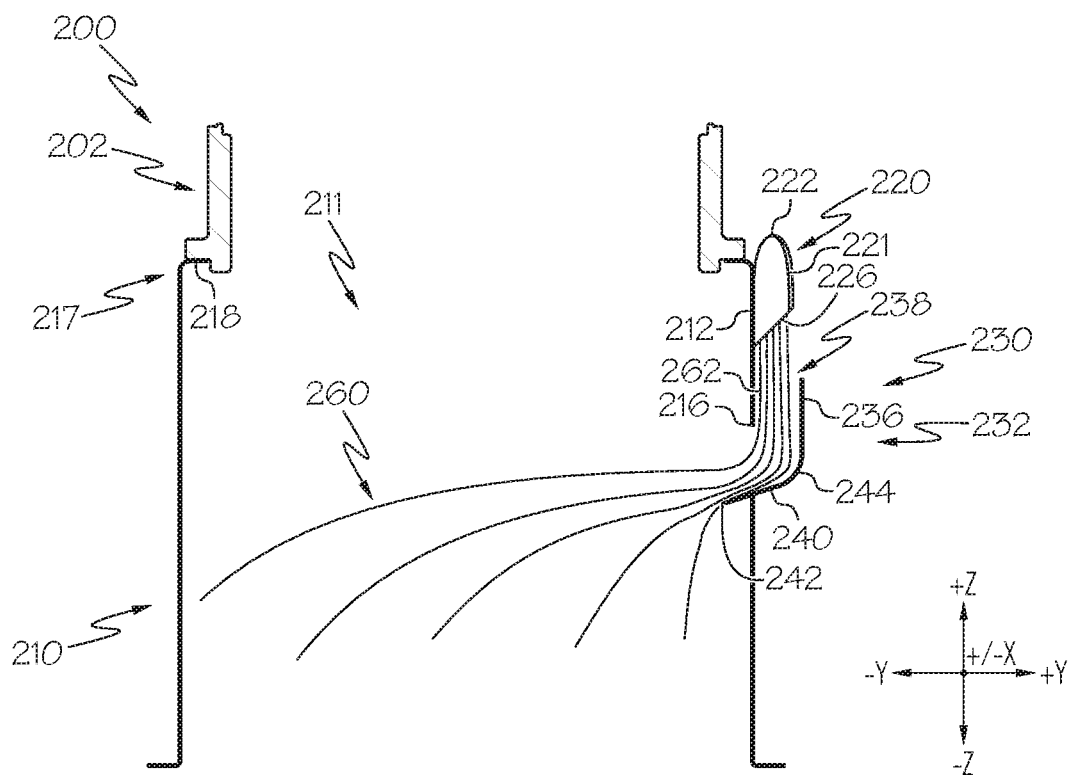
FIG. 5A is a cross-section taken along lines 4A-4A of FIG. 3A and illustrates a water curtain, according to one or more embodiments shown and described herein.
Figure 5B:
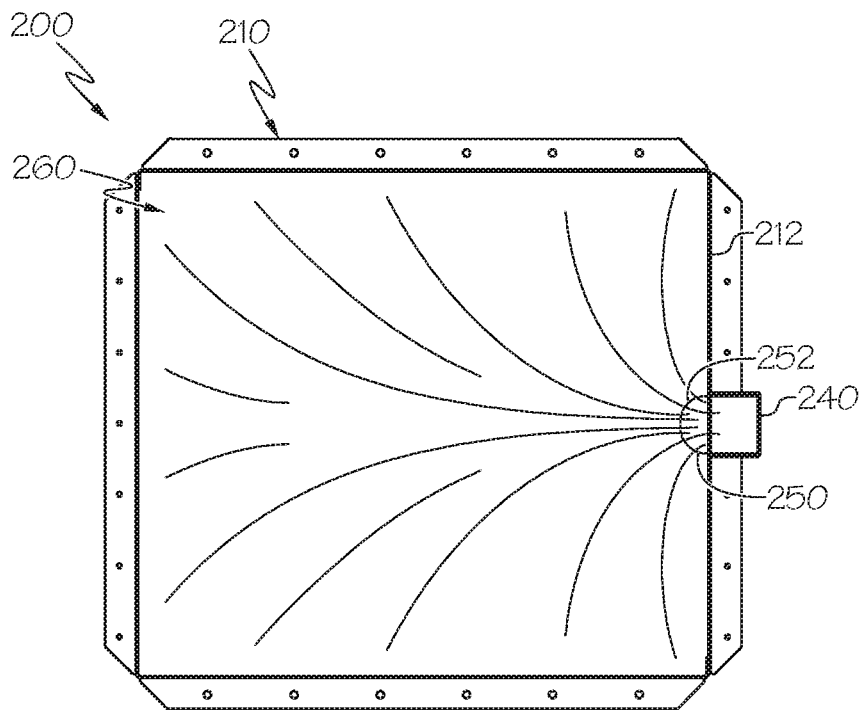
FIG. 5B is a cross-section taken along line 4B-4B of FIG. 3B and illustrates a water curtain, according to one or more embodiments shown and described herein.

At an upper end 217 of the riser 210 may be a hatch mounting flange 218 for attaching a loading hatch 202 (illustrated in FIG. 2). The hatch mounting flange 218 may extend inward into the infeed opening 211, as shown, or may, in some embodiments, extend outward away from the infeed opening 211. FIGS. 4A-4C illustrate an embodiment of the infeed chute 200 including the loading hatch 202 coupled to the riser 210. FIG. 4A illustrates a top view, FIG. 4B illustrates a side view, and FIG. 4C illustrates another side view of the infeed chute 200. FIG. 5A illustrates a cross-section of FIG. 5A taken along line 4A-4A and FIG. 5B illustrates a cross-section of FIG. 5B taken along line 4A-4B. In particular, FIG. 5A illustrates the loading hatch 202 supported on the hatch mounting flange 218. The loading hatch 202 may be coupled to the hatch mounting flange 218 through any conventional techniques including, but not limited to, fasteners, adhesives, welding, brazing, and the like.

Referring again to FIG. 3A, a portion of the riser 210 broken away is depicted so as to illustrate a greater amount of the infeed opening 211. As illustrated, a water inlet 216 may be formed or otherwise incorporated into the sidewall 212. In some embodiments, water inlets may be formed in multiple sidewalls of the riser 210. For example, opposing sidewalls may include water 262 inlets. The water inlet 216 may have any shape. For example, the water inlet 216 may be rectangular, rounded, or a combination thereof. The water inlet 216 may be configured to spread water laterally across the infeed opening 211. In some embodiments the water inlet 216 may be configured to direct a spray 260 of water into a water curtain that extends both laterally and longitudinally across the infeed opening 211. For example, and as illustrated a spray 260 of water is depicted as being directed both in the Y (lateral) direction and X (longitudinal) direction of the depicted coordinate axes.

Referring collectively to FIGS. 3A and 3B, to aid in spreading water, a water spreading unit 230, may be coupled to the water inlet 216. The water spreading unit 230 may be configured to direct water 262 laterally across the infeed shoot. In some embodiments, the water spreading unit 230 may aid in forming the spray 260 of water into the water curtain shape noted above. The water spreading unit 230 may include a water spreading housing 232 and a tongue 240. The water spreading unit 230 may spread the water 262 as it enters the riser 210 to provide the water curtain that extends both laterally (e.g., in the Y-direction of the depicted coordinate axes) and longitudinally (e.g., in the X-direction of the depicted coordinate axes) across the infeed chute 200 (see also FIG. 5B).

The water spreading housing 232 may be coupled to an outside surface of the sidewall 212 of the riser 210 around the water inlet 216 through any conventional techniques includes adhesive bonding, braising, welding, etc. The water spreading housing 232 may form a partial enclosure around the water inlet 216. For example, the water spreading housing 232 may include opposing sidewalls 234a, 234b and connecting wall 236 that connects the opposing sidewalls 234a, 234b. The opposing sidewalls 234a, 234b, and connecting wall 236 may define a water receiving opening 238.

The tongue 240 may be coupled to the water spreading housing 232 and extend through the water inlet 216 of the riser 210. For example, the tongue 240 may be coupled to the opposing sidewalls 234a, 234b, and the connecting wall 236 opposite the water receiving opening 238. As shown in FIG. 3A, the tongue 240 may extend from the water spreading housing 232 to an edge 242. The shape of the edge 242 may aid in fanning out or spreading the spray 260 of water 262 into the curtain shape. For example, the edge 242 of the tongue 240 may be rounded as shown (see also FIG. 4B). However, other shapes are contemplated and possible (e.g., duckbill, square, rectangle, etc.) Referring again to FIG. 5A, a transition 244 between the tongue 240 and the connecting wall 236 may be curved. Such transition 244 may aid in redirecting a stream 262 of water from a first direction (e.g., the Z direction of the depicted coordinate axes) to a second direction different that the first direction, to provide the spray 260 of water laterally across the infeed opening 211. As illustrated, the tongue 240 may be angled at a non-zero angle below the horizontal axis (e.g., Y-axis of the depicted coordinate axes). It is also contemplated that the tongue 240 may be provided with grooves or contours to further contours the flow of water 262 as it leaves the tongue 240.

Figure 6A:
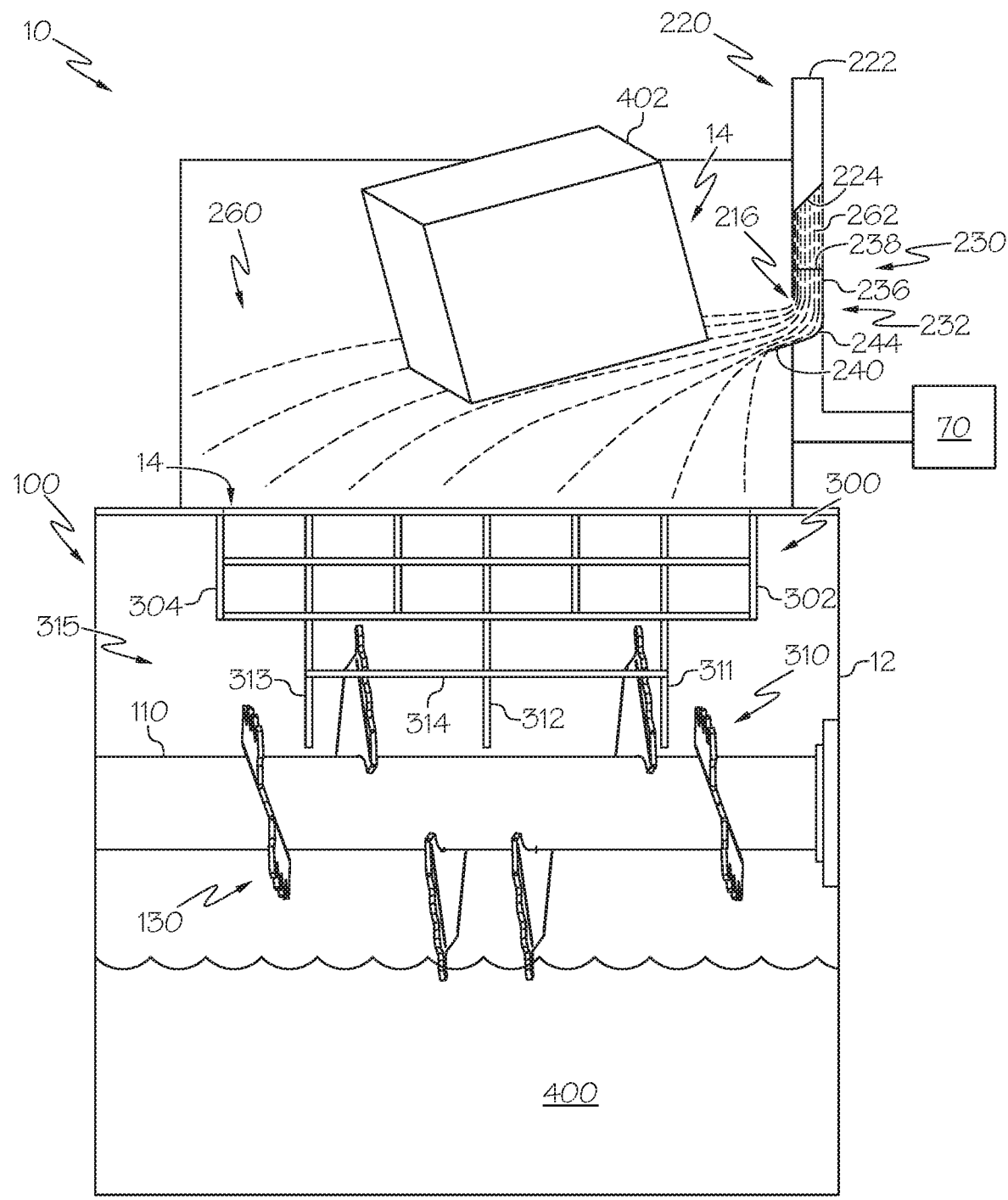
FIG. 6A schematically illustrates a material bale being placed in an infeed chute of a material application device, according to one or more embodiments shown and described herein.
Figure 6B:
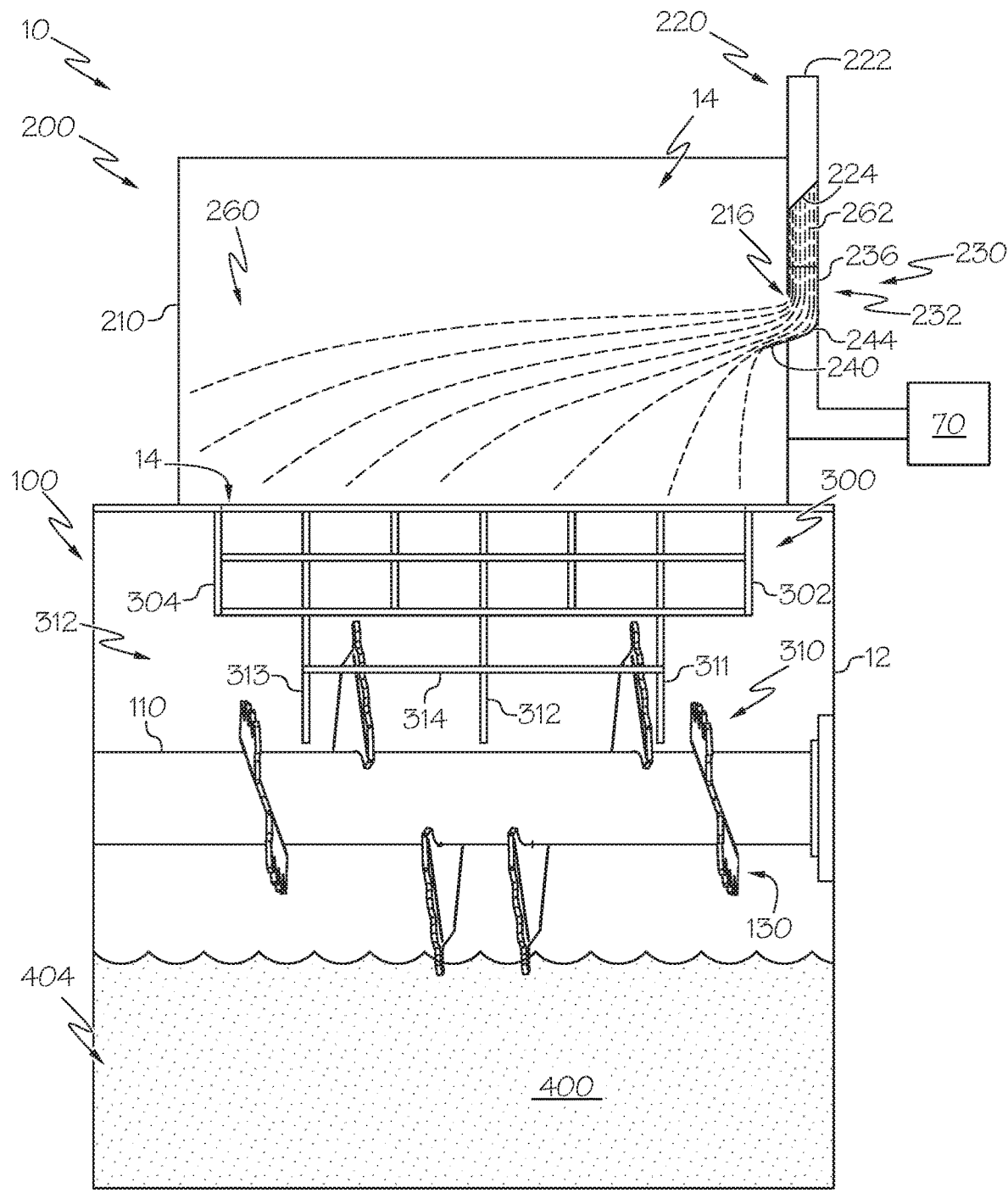
FIG. 6B schematically illustrates the ground particulate of the material bale of FIG. 6A after passing through a water curtain and bale grinder, according to one or more embodiments shown and described herein.

To provide water 262 to the water receiving opening 238 of the water spreading housing 232 and, thus, through the water inlet 216, a water pipe 220 may be fluidly coupled to a water source 70 (schematically depicted in FIGS. 6A and 6B). An output end 221 of the water pipe 220 may be positioned so as to be able to direct water 262 through the water receiving opening 238 of the water spreading housing 232. Water sources may include, but are not limited to, fire hydrants, lakes, or other public or private water 262 sources. In some embodiments, it is contemplated that a pressurized water source 70 may be used.

Referring again to FIGS. 3A and 3B the water pipe 220 may be positioned adjacent and/or coupled to the riser 210 of the infeed chute 200. The water pipe 220 may extend to a height greater than the water receiving opening 238 of the water spreading housing 232. In some embodiments, the water pipe 220 may extend over the top of the riser 210, as illustrated. The water pipe 220 may include a curved portion 222 that directs water 262 flowing through the water pipe 220 out of the output end 221 over the water receiving opening 238 of the water spreading housing 232.

Referring now to FIG. 4C, the curved portion 222 of the water pipe 220 may end at the output end 221 at a pipe opening 226. The output end 221 of the water pipe 220 may be positioned above and spaced from the water spreading housing 232 in a vertical direction (e.g., Z direction of the depicted coordinate axes). For example, and as illustrated, a center of the pipe opening 226 may be position a gap distance ($d_g$) away from the water receiving opening 238 of the water spreading housing 232. In some cases, government regulations may require such a gap to prevent possible contamination of public water 262 sources. It is contemplated that in some embodiments there may not be a gap, and instead the output end 221 of the water pipe 220 may be directly fluidly coupled to the water spreading housing 232.

Referring now to FIG. 5A, the pipe opening 226 may be angled at a non-zero angle with respect to the horizontal axis (e.g., the Y-axis of the depicted coordinate axes). That is, the pipe opening 226 may be sloped. This may provide a benefit of improved directing of water 262 from the pipe opening 226 into the water receiving opening 238 of the water spreading housing 232 by providing a smoother flow of fluid 400 from the water pipe 220. In some embodiments, the pipe opening 226 of the water pipe 220 may not be sloped.

Referring again to FIG. 4C, a water fill valve 224 may be fluidly coupled to the water pipe 220. The water fill valve 224 may allow for control of water 262 through the water pipe 220 through the pipe opening 226. The water fill valve 224 may be manually controlled through a handle, lever, or the like. In some, the water fill valve 224 may be electronically controlled by electronic controller.

Referring again to FIG. 2, as noted hereinabove, the material application machine 10 may be used to produce a material slurry. Accordingly, in some embodiments, positioned within the tank 12 of the material application machine 10 may be an agitator 100. The agitator 100 is positioned below the opening 14 of the tank 12 and is positioned to agitate the material slurry within the tank 12. The agitator 100 may include a rotatable shaft 110 that extends between the first lateral sidewall 20 and the second lateral sidewall 22 of the tank 12. The agitator 100 may be rotatively coupled to the first and second lateral sidewalls 20, 22 at either end of the rotatable shaft 110. Accordingly, the agitator 100 may rotate about an axis defined by the rotatable shaft 110 within the tank 12. Agitators according to the present disclosure are more fully described in U.S. patent application Ser. No. 16/034765, filed Jul. 16, 2018, entitled "Hydroseeders having Integrated Bale Grinders and Methods," hereby incorporated by reference in its entirety.

Extending from the rotatable shaft 110 of the agitator 100 may be a plurality of mixing paddles 120. The plurality of mixing paddles 120 may be arranged in pairs wherein the mixing paddles 120 of each pair are positioned opposite one another across a diameter of the rotatable shaft 110. Each paddle may include a paddle base 122 coupled to the rotatable shaft 110 and a paddle body 124 extending from the paddle base 122 to a free end 126 of the paddle. As illustrated, the plurality of mixing paddles 120 may extend along a first segment of the rotatable shaft 110.

A bale grinder may be incorporated into the agitator 100. The bale grinder may comprise a plurality of grinding flights 130 may extend from the agitator 100 disposed proximate at least one edge of the rotatable shaft 110, and under the opening 14 of the tank 12. For example, the plurality of grinding flights 130 may extend along a second segment of the rotatable shaft 110 directly under the opening 14 of the tank 12. Accordingly, the plurality of mixing paddles 120 may extend along the first segment and the plurality of grinding flights 130 may extend along a second segment that is separate from the first segment. Accordingly, the plurality of mixing paddles 120 may be separate from the plurality of grinding flights 130. The plurality of grinding flights 130 are positioned to grind a material bale as it is introduced into the tank 12 of the material application machine 10. Referring also to FIGS. 6A and 6B, a schematic view of the material application machine 10 with the infeed chute 200 during a grinding application is depicted. As illustrated and noted above, the plurality of grinding flights 130 may be positioned directly beneath the opening 14 of the tank 12 to receive the material bale 402 as it is passed through the opening 14. The plurality of grinding flights 130 are configured to grind up material bales as they are passed through the opening 14 of the tank 12. Accordingly, the plurality of grinding flights 130 may include serrated edges.

Referring again to FIG. 2, the material application machine 10 may include a basket 300 that extends from the opening 14 of the tank 12 and directs a material bale 402 toward the plurality of grinding flights 130. Baskets according to the present disclosure are more fully described in U.S. patent application Ser. No. 16/034765, filed Jul. 16, 2018, entitled "Hydroseeders having Integrated Bale Grinders and Methods," hereby incorporated by reference in its entirety. Referring also to FIGS. 6A and 6B, the basket 300 includes a frame 302. The frame 302 may attach to a surface of the top wall 16 of the tank 12 around the opening 14. The basket 300 may be coupled to the tank 12 through a variety of means including, but not limited to fasteners, welding, and the like. In some embodiments, the basket 300 may be removable from the tank 12 so as to provide access to the interior 18 of the tank 12, such as when maintenance needs to be performed inside of the tank 12.

The frame 302 of the basket 300 may define flight paths 315 that allow the plurality of grinding flights 130 to rotate through a portion of the basket 300. For example, the frame 302 may include a plurality of rungs 310 that define a base of the basket 300. In the present embodiments, three parallel rungs 311, 312, and 313 are depicted spaced apart from one another. However, it is contemplated that any number of rungs 310 may be used. The spaces around the rungs 311, 312, and 313 may define the flight paths 315 for the grinding flights 130 to rotate through. In some embodiments, the plurality of rungs 310 may have serrated edges that contact the material bales so as the encourage contact between the material bales and the plurality of grinding flights 130. That is, the serrations of the plurality of rungs 310 may grab onto the material bale 402 to better hold the material bale 402 for the grinding operation of the grinding flights 130.

As the plurality of grinding flights 130 grind up material bales, the basket 300 may prevent particles of the material bale 402 from being added to the material slurry 400 that are greater than a predetermined size. Accordingly the frame 302 of the basket 300 may exclude particles of a material bale 402 above a predetermined size from entering the material slurry 400. For example, particles of material bale 402 which may clog a material pump or sprayer unit. In some embodiments, particles of material bale 402 which are greater than a distance between adjacent rungs 310 (e.g., 311 and 312) may be excluded from entering the material slurry 400.

Referring to FIG. 6A and 6B, as a material bale 402 enters the infeed chute 200 it passes through the spray 260 of water as provided through the water inlet 216 and/or water spreading unit 230, as described above. Accordingly, the spray 260 of water 262, provided as a water curtain, pre-wets the material bale 402 before it reaches the plurality of grinding flights 130. This increases the density of the material bale 402 and may prevent pieces of the material bale 402 from bouncing back up during the grinding operation by the plurality of grinding flights 130. Furthermore, the spray 260 of water also acts as a curtain to block particles of material bale 402 from bouncing back through the spray 260 of water 262. Accordingly, and as shown in FIG. 6B, the majority or whole of the material bale 402 is added into the material slurry 400. This substantially increases the efficiency of creation of the material slurry 400. As the material bale 402 is ground to the desired particle size and passed through the basket 300 into the fluid 400 below, the mixing paddles 120 (shown in FIG. 2, may rotate to continue to agitate and mix the slurry such that the particles of the material bale 402 do not settle to the bottom of the tank 12. It is noted that in some embodiments, the spray 260 of water may also be used to fill the tank 12 with the fluid 400 or another water fill source may be used.

Accordingly, aspects of the present disclosure are directed to infeed chutes for material application machines. Material application machines, such as hydroseeders, generally include machines used to apply ground coverage materials to the ground. For example, the infeed chute includes a water inlet and/or water spreading unit that sprays water across the opening of the infeed chute to pre-wet application material as it is passed through the infeed chute and into a tank of the material application machine. By pre-wetting the application material as it enters the material application machine, the weight of the material increases which may prevent the material from coming back up through the infeed chute. Moreover, the water curtain also acts to block application material that tries to come back up through the infeed chute.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An infeed chute comprising:
   a riser comprising a sidewall and defining an infeed opening extending through the riser, wherein the riser is configured to be coupled to an opening of a tank of a material application machine such that application material passed through the infeed opening of the riser enters the tank of the material application machine, wherein the sidewall comprises a water inlet formed therein;
   a water pipe configured to be fluidly coupled to a water source; and
   a water spreading unit coupled to the water inlet, and configured to direct water laterally across the infeed chute, the water spreading unit comprising:
   a water spreading housing coupled to the water inlet of the sidewall of the riser;
   a tongue coupled to the water spreading housing and extending into the water inlet of the riser; and
   an output end of the water pipe is positioned above and spaced from the water spreading housing in a vertical direction.

2. The infeed chute of claim 1, wherein the tongue comprises a rounded edge.

3. The infeed chute of claim 1, wherein the water spreading unit spreads the water as it enters the riser to provide a water curtain that extends both laterally and longitudinally across the infeed chute.

4. The infeed chute of claim 1, wherein the output end of the water pipe comprises a pipe opening that is angled at a non-zero angle relative to a horizontal axis.

5. A material application machine comprising:
   a tank comprising an opening and configured to hold an application material; and an infeed chute, the infeed chute comprising:
   a riser comprising a sidewall and defining an infeed opening extending through the riser, wherein the riser is coupled to the opening of the tank such that the application material passed through the infeed opening of the riser enters the tank, wherein the sidewall comprises a water inlet formed therein;
   a water pipe configured to be fluidly coupled to a water source; and
   a water spreading unit coupled to the water inlet, and configured to direct water laterally across the infeed chute, the water spreading unit comprising:
   a water spreading housing coupled to the water inlet of the sidewall of the riser;
   a tongue coupled to the water spreading housing and extending into the water inlet of the riser; and
   an output end of the water pipe is positioned above and spaced from the water spreading housing in a vertical direction.

6. The material application machine of claim 5, wherein the tongue comprises a rounded edge.

7. The material application machine of claim 5, wherein the water spreading unit spreads the water as it enters the riser to provide a water curtain that extends both laterally and longitudinally across the infeed chute.

* * * * *